Nov. 11, 1952 W. E. DOBBINS 2,617,588

RESULTANT COMPUTER

Filed Aug. 18, 1950 2 SHEETS—SHEET 1

INVENTOR
WILLIS E. DOBBINS
By Herbert E. Metcalf
HIS PATENT ATTORNEY

Nov. 11, 1952 W. E. DOBBINS 2,617,588

RESULTANT COMPUTER

Filed Aug. 18, 1950 2 SHEETS—SHEET 2

INVENTOR
WILLIS E. DOBBINS

By Herbert E. Metcalf

HIS PATENT ATTORNEY

Patented Nov. 11, 1952

2,617,588

UNITED STATES PATENT OFFICE 2,617,588

RESULTANT COMPUTER

Willis E. Dobbins, Manhattan Beach, Calif., assignor to Northrop Aircraft, Inc., Hawthorne, Calif., a corporation of California

Application August 18, 1950, Serial No. 180,274

7 Claims. (Cl. 235—61)

The present invention relates to computers, and more particularly to a vector resultant computer.

Individual vectors can be represented in magnitude and sense by electrical entities as for example, by voltage and phase, respectively. In addition, the sum of two or more vectors is often required, such as when determining the magnitude of a resultant with only the two orthogonal component vectors known for example. If these vectors are each specified by voltages at the selected phase difference, they may be manipulated according to electrical rules. Further, multiple operation computer stages, using cascaded units, will make possible the solution of various combinations of vectors. Thus, electrical devices can be efficiently utilized to define completely, and operate upon, separate and component vectors.

It is, accordingly, an object of this invention to provide electrical means, specifically, a motor-generator device for generating continuously and instantaneously the vectorial sum of two vectors, for example.

Another object of the invention is the provision of means for the handling or processing of vectors of differing sense and direction so that a consistently correct output is derived, regardless of a mixed polarity input.

A further object of the invention is to provide a new and novel vector resultant computer that is simple of construction and operation.

The foregoing objects are accomplished, in short, by employing a synchronous motor to drive two identical A. C. generators preferably coupled to opposite ends of the motor drive shaft, wherein D. C. vector magnitude voltages are applied through rectifier circuits to each rotor (field) of the generators. The stators of these generators are floated structures and can be mechanically rotated so that the relative angular position of the stators, with respect to their mutually and rigidly connected rotors, will produce voltages of a proper phase difference. By connecting the stators in series and fully rectifying the sum of the two alternating voltages across the stators, a D. C. voltage proportional to the vectorial sum of the original two input vectors is obtained.

This invention possesses numerous other objects and features, some of which, together with the foregoing, will be set forth in the following description of a preferred embodiment of the invention, and the invention will be more fully understood by reference to the attached drawings in which.

Figure 1:
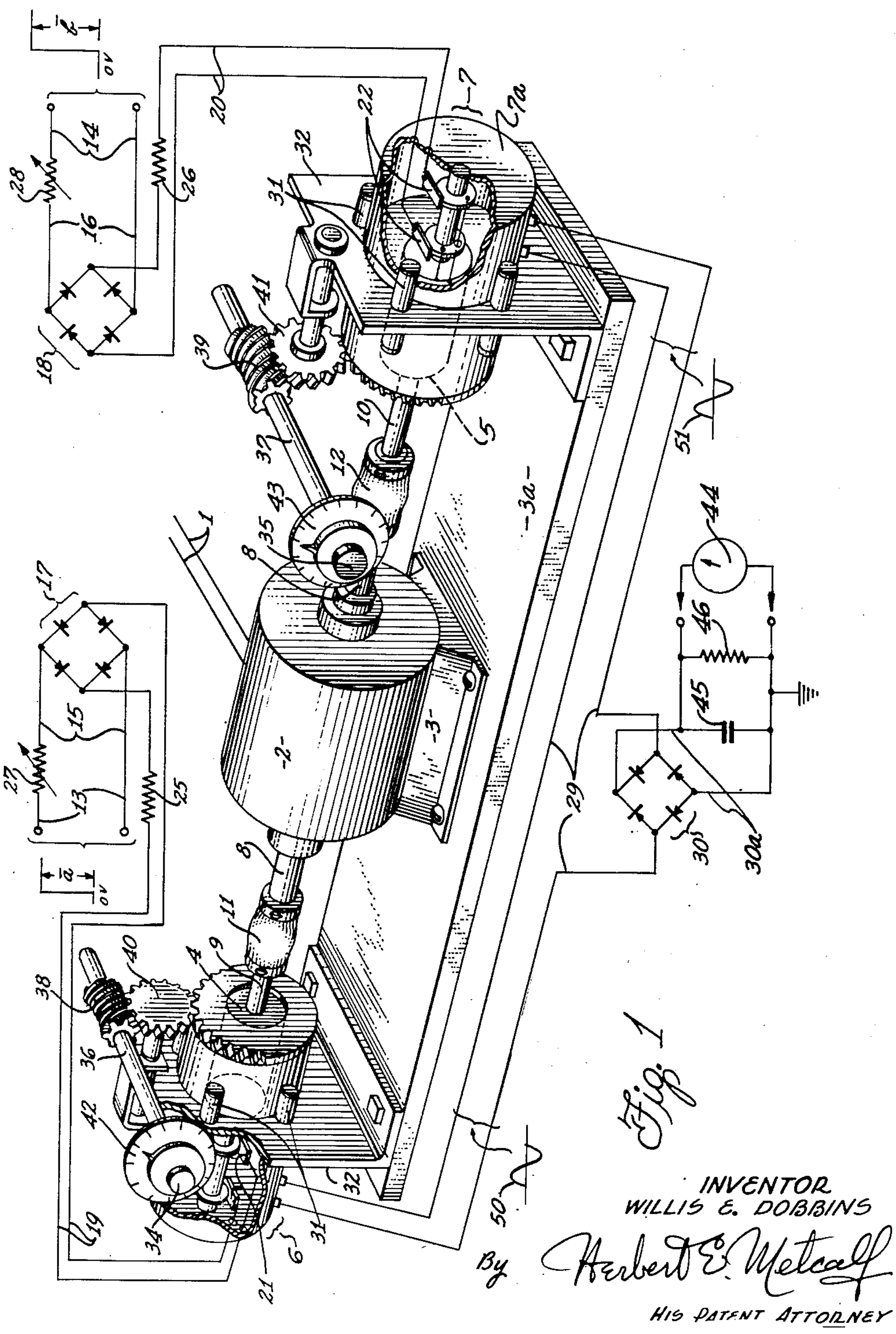
Figure 1 is a simplified schematic view of a two-vector resultant computer of preferred construction.

Referring first to Figure 1, a constant frequency A. C. power is supplied through leads 1 to a synchronous motor 2 whose support 3 is mounted on a base 3*a*. This motor 2 rotates the fields 4 and 5 of two A. C. generators 6 and 7, respectively, which are coupled one on each end of drive shaft 8 of motor 2. The two ends of the drive shaft 8 are connected to rotor shafts 9 and 10 by means of two couplings 11 and 12, respectively. The fields 4 and 5 rotate inside of stators (armatures) 6*a* and 7*a*, respectively.

The rotors of the two A. C. generators 6 and 7 are to be energized by currents due to impressed D. C. voltages corresponding in magnitude to two vector components. These vector voltages are applied at two separate sets of inputs 13 and 14, respectively. Direct current will flow in leads 15 and 16 because of the voltages applied at inputs 13 and 14, respectively. If the voltage at input 13 or 14 is reversed, that is, the vector voltage is oppositely directed, full wave bridge rectifier circuits 17 and 18 will maintain the current in leads 19 and 20 to the fields of the generators 6 and 7, respectively, in the same direction, regardless of polarity at either input 13 or 14. Errors due to hysteresis effects are largely eliminated if reversal of current in the fields 4 and 5 of the generators is prevented.

A linear relationship should exist between field current and stator output voltage of the A. C. generators 6 and 7. The linearity will be that of the open circuit saturation curve for the machines. In order to improve the linearity, and because the diodes of the rectifiers 17 and 18 have fairly high resistances so that any slight change in the diode path may affect the field circuit objectionably, a high resistance wound field is provided for each generator.

The leads 19 and 20 are connected to the rotatable fields of the A. C. generators 6 and 7 by using respective slip-ring-brush sets 21 and 22. Resistances 25 and 26 are positioned to limit the current in leads 19 and 20, respectively.

Adjustable resistances 27 and 28, respectively, are placed in leads 15 and 16 and are set to balance the A. C. generators so that the same ratio of D. C. input to A. C. output voltage of the generators is obtained. Leads 29 are used to connect the two stators together in series and to a diode bridge rectifier circuit 30, to give a D. C. output voltage proportional to the vectorial sum of the two input vectors in rectifier output leads 30*a*.

Each generator stator 6*a* and 7*a* is supported as by roller bearings 31 which are spaced evenly around the periphery of central openings in generator supports 32. Thus, the stators 6*a* and 7*a* can turn freely about the axes of the rotor shafts 9 and 10. The turning mechanism for the stators 6*a* and 7*a* consists of knobs 34 and 35 set on the ends of shafts 36 and 37, respectively moving worm gears 38 and 39, respectively, meshed to pinions 40 and 41. The latter drive the geared stators 6*a* and 7*a* of the A. C. generators. Dials 42 and 43 for the respective knobs 34 and 35 are calibrated so that a zero position for both dials indicates that both generator stators 6*a* and 7*a* are aligned identically with respect to a particular fixed base plane reference position and with respect to the particular rotors 4 and 5.

When a D. C. voltmeter 44 is placed across the parallel condenser 45 and resistor 46 combination attached to output 30*a* of rectifier circuit 30, and is properly calibrated, it reads the resultant magnitude of the two input vectors represented by vector voltages applied to inputs 13 and 14.

Figure 2:
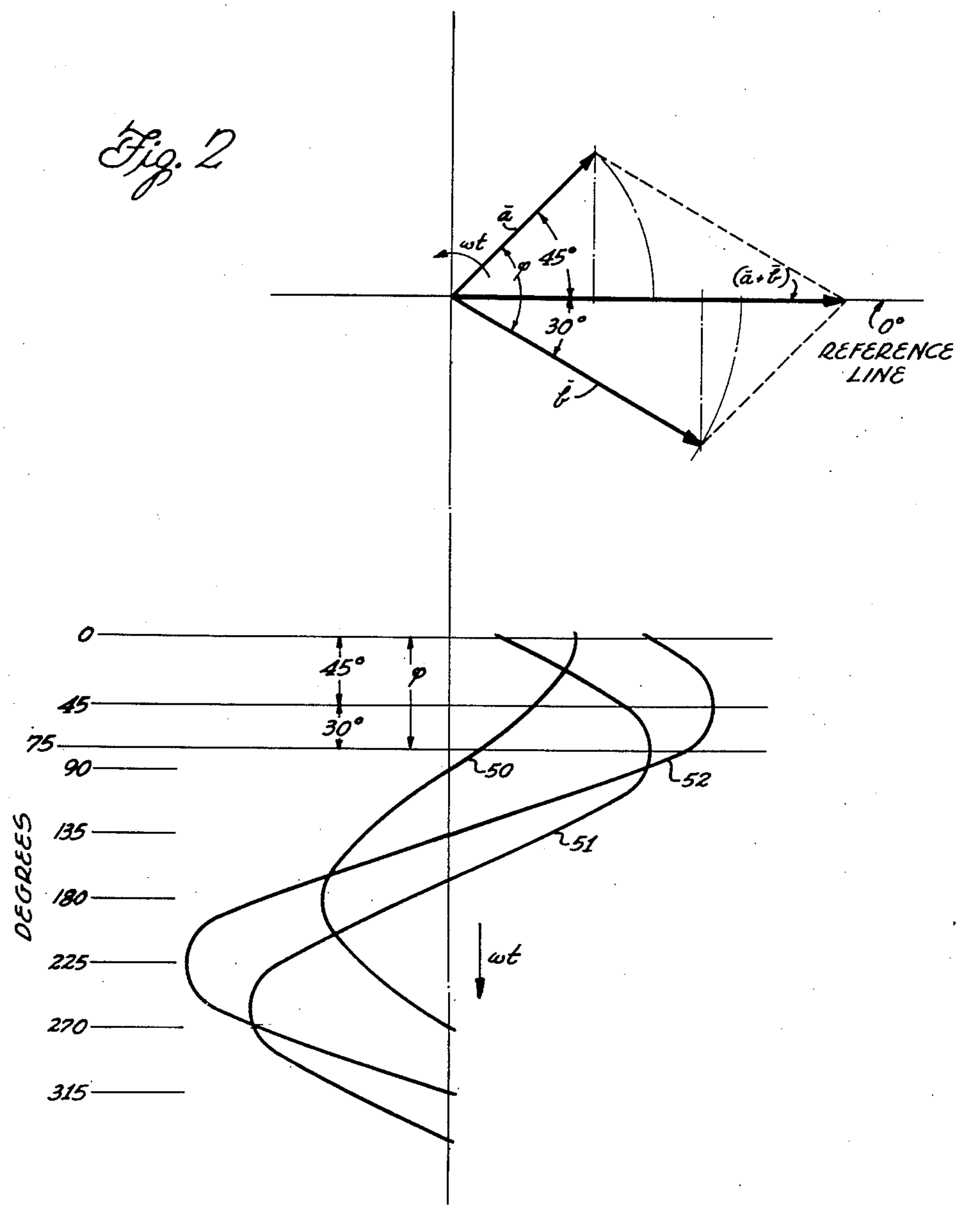
Figure 2 is a graphical diagram of two vectors whose resultant magnitude is to be solved by the present invention, together with characteristic waveforms appearing in the computer.

Referring to Figure 2, assume, for example, that the resultant magnitude, $(\overline{a}+\overline{b})$ of the two vectors $\overline{a}$ and $\overline{b}$, there shown, is to be physically determined by use of the present invention. The two vectors are orientated, in polar coordinates, at +45 and +330 degrees (or −30°) respectively, from the 0 degree reference line in the graphical solution shown. For purposes of the present invention, the entire parallelogram made up of vectors *a* and *b* is considered to rotate in a counter-clockwise direction with the uniform angular velocity $\omega$, and the horizontal projections of the various vectors represent the displacement as a function of time. The reason for this will be made more evident in the ensuing discussion.

The mode of operation is as follows:

The adjustable resistors 27 and 28 are first set such that equal outputs are obtained from each generator for equal inputs. One manner of doing this is to place a D. C. voltage equivalent to a unit vector on each of the inputs 13 and 14 and to check the output reading on voltmeter 44. The outputs thus obtained should be identical. As a further check on the calibration of the output D. C. voltmeter 44, the dials 42 and 43 are placed, for example, to read a phase difference of 90°. Now then when a unit vector voltage is simultaneously placed on each of the inputs, the output voltmeter should read a value proportional to $\sqrt{2}$ times the unit vector voltage. The computer is now properly set.

For the particular example, shown in Figure 2, the pointer of one dial 42 is set at 45° corresponding to the angular coordinate of vector $\overline{a}$; and, the other dial 43 is set at 330° which corresponds to the angular coordinate of vector $\overline{b}$. Now then, when D. C. voltages proportioned to vectors $\overline{a}$ and $\overline{b}$ are applied at corresponding inputs 13 and 14, field currents will flow in the generators such that linearly proportional A. C. voltages, differing in relative phase by an angle $\phi$ which is 75° in this case (see Figure 2), are induced in the respective stators.

These stator output A. C. voltages are generated on the outputs of generators 6 and 7, respectively, as shown by waveforms 50 and 51. The maximum amplitude of these latter A. C. waveforms are proportional to the D. C. input voltages which induced them.

Since these A. C. voltages 50 and 51, appearing on the generator outputs, are to be vectorially added, the series connection of the stators accomplishes this at each instant of time to give a resultant A. C. voltage as shown by waveform 52 in Figure 2. An A. C. voltmeter could be used, when properly calibrated, to read the effective value of the resultant waveform 52; however, the present invention preferably feeds this output A. C. waveform through an output rectifier 30. The D. C. output voltmeter 44 then reads the magnitude of the resultant of the two input vectors.

It is thus seen that the resultant magnitude of any two vectors, separated by any angle $\phi$, can be obtained by use of the present computer. The magnitude being represented by the reading on a voltmeter of the resultant A. C. waveform 52, as shown in Figure 2, or the rectified waveform 52.

There is thus provided a reliable and efficient vector resultant computer, since the components employed are simple and durably stable devices. The circuitry, however, includes rectifying means so that input signals may be of any polarity. Obvious ease of operation is apparent, and a continuous and direct solution of varying input vectors is secured with the computer of the present invention. It is also a versatile device, as it will be apparent that a multiplicity of the computers of the present invention can be connected in appropriately designed circuits to perform numerous functions. As a servo network, for example, the computer of the present invention is particularly adapted to control electrical mechanisms by comparing its output with a specified value, and inserting and detected differences back into the controlled system until correct inputs to the computer is achieved.

It is to be noted that while the invention has been described as having the fields of the generators rotate, the novel results of the present invention can equally well be achieved by rotating the generator armatures.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A vector resultant computer comprising first and second A. C. generators of substantially similar characteristics each having a rotor and a stator, means for simultaneously rotating the rotor of each generator at the same constant speed, a first input for applying a D. C. voltage representing the amplitude of a first vector to the rotor of said first generator, a second input for applying a D. C. voltage representing the amplitude of a second vector to the rotor of the second generator, means connecting the stators of each generator in series to form an output line, and means for axially turning one of said stators with respect to the other stator.

2. Apparatus in accordance with claim 1 wherein means are provided in each input line to apply the first and second vector voltages to the respective connected members in the same polarity irrespective of the polarity of the vector voltages.

3. Apparatus in accordance with claim 1 wherein means are provided in each input line to apply the first and second vector voltages to the respective connected members in the same polarity irrespective of the polarity of the vector voltages, said latter means including a full wave rectifier.

4. Apparatus in accordance with claim 1 wherein said turning means is calibrated in degrees to set said generators to add vectors of known angular difference.

5. Apparatus in accordance with claim 1 wherein said output line is provided with a full wave rectifier connected to operate an indicating device calibrated to indicate a vector voltage resultant.

6. Apparatus in accordance with claim 1 wherein said turning means is calibrated in degrees to set said generators to add vectors of known angular difference, and wherein said output line is provided with a full wave rectifier connected to operate an indicating device calibrated to indicate a vector voltage resultant.

7. Apparatus in accordance with claim 1 wherein means are provided in each input to provide an equal output in each generator for equal inputs thereto.

WILLIS E. DOBBINS.

REFERENCES CITED

The following references are of record in the file of this patent:

UNITED STATES PATENTS

| Number | Name | Date |
|---|---|---|
| 2,193,079 | Schrader | Mar. 12, 1940 |
| 2,200,103 | Shutt | May 7, 1940 |